D. J. BROWN.
APPLIANCE FOR MENDING BROKEN VEHICLE WHEELS.
APPLICATION FILED NOV. 24, 1919.
1,387,918.
Patented Aug. 16, 1921.
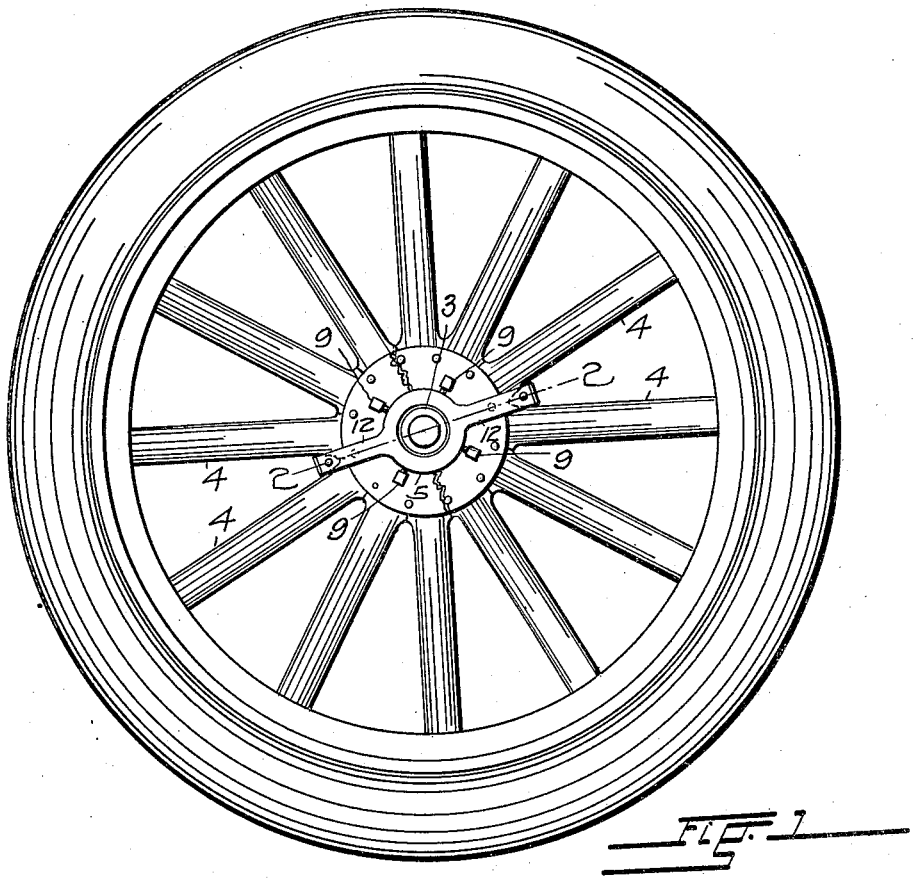
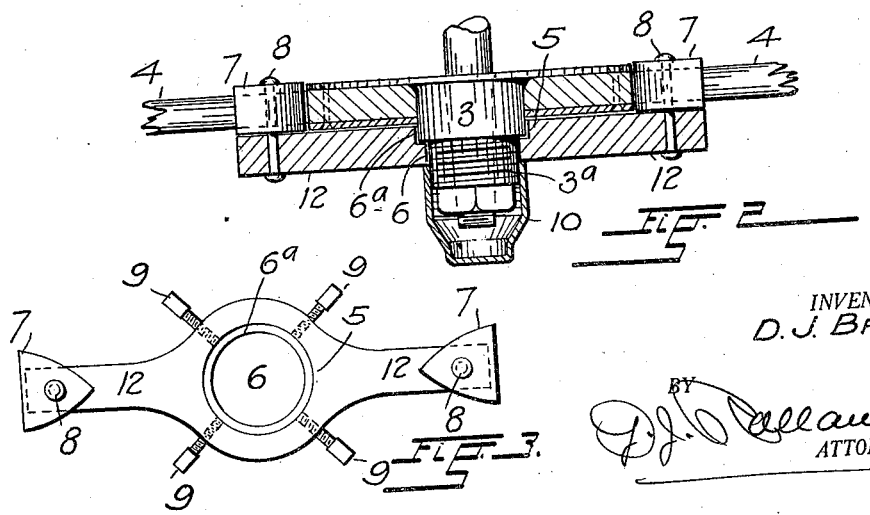
INVENTOR.
D. J. BROWN.
ATTORNEY.

UNITED STATES PATENT OFFICE.

DANIEL J. BROWN, OF NORTHPORT, NEBRASKA.

APPLIANCE FOR MENDING BROKEN VEHICLE-WHEELS.

1,387,918.

Specification of Letters Patent. Patented Aug. 16, 1921.

Application filed November 24, 1919. Serial No. 340,317.

*To all whom it may concern:*

Be it known that I, DANIEL J. BROWN, a citizen of the United States, residing at Northport, in the county of Morrill and State of Nebraska, have invented certain new and useful Improvements in Appliances for Mending Broken Vehicle-Wheels, of which the following is a specification.

My invention relates to an appliance for temporarily mending broken vehicle wheels, and its object is to provide a device of very simple construction which when applied to the hub of a broken automobile wheel will hold the severed parts in place on the axle until the wheel can be permanently repaired.

With this object in view, my invention comprises a brace composed of a bar having a central bore to receive the hub of a vehicle wheel and a plurality of set bolts for its attachment to the hub.

The bar carries at its extremities pivoted wedge-shaped blocks adapted to enter the crotches between adjoining spokes whereby to hold the several parts of a broken wheel against relative displacement.

In the accompanying drawings in the various views of which like parts are similarly designated, Figure 1 represents a side elevation of an automobile wheel to which my invention is applied;

Fig. 2, a section taken on the line 2—2, Fig. 1, drawn to an enlarged scale, and Fig. 3, an elevation of the device separate from the wheel.

The reference character 2 designates an automobile wheel of conventional construction including a hub 3 and radiating spokes 4.

The mending brace of my invention consists of a bar 5 made of metal, wood or other suitable material and having a central bore 6 to receive the hub of the wheel.

The portion of the bar around its bore is shaped to form a link between two oppositely projecting arms 12 which at their outer extremities carry the wedge shaped blocks 7.

The blocks are pivotally connected with the arms by means of rivet pins 8, and a plurality of set bolts 9 extend through threaded openings of the link into the bore of the bar to clampingly engage the outer surface of a hub around which it is placed.

The bore of the bar has in the construction shown in the drawings, a countersink 6ª conforming with the contour of the body portion of the wheel hub which is larger in diameter than the screw threaded end portion 3ª of the same upon which the hub cap 10 is secured, and the set bolts are positioned on the link of the bar to enter the enlarged portion of the bore so as to engage the body of the hub.

In the event of a wheel of an automobile being broken, the driver removes the hub cap, places the brace over the wheel hub with the wedge blocks at its ends in the spaces between two pairs of spokes at opposite sides of the break and secures the same by means of the set bolts. The hub cap may then be replaced and the brace will hold the severed parts of the wheel together until the wheel can be permanently repaired.

The brace as shown in the drawings, is particularly designed for use on Ford automobiles, but it will be understood that by slight changes in its details of construction it may be readily adapted to be applied to wheels of different makes of cars.

What I claim is:

1. An appliance of the character described comprising a bar having a bore to receive a wheel hub, blocks on the bar at opposite sides of the bore, adapted to enter the spaces between pairs of spokes of the wheel at opposite sides of its hub, and means for securing the bar upon the hub.

2. An appliance of the character described comprising a bar having a bore to receive a wheel hub, wedge-shaped blocks on the bar at opposite sides of the bore, adapted to enter the spaces between pairs of spokes of the wheel at opposite sides of its hub, and set-screws for securing the bar upon the hub.

3. An appliance of the character described comprising a bar having a bore to receive a wheel hub, blocks pivoted on the bar at opposite sides of the bore, adapted to enter the spaces between pairs of spokes of the wheel at opposite sides of its hub, and set-screws for securing the bar upon the hub.

4. An appliance of the character described comprising a brace having means for securing it to the hub of a vehicle wheel, and means to connect with spokes of the wheel at opposite sides of the hub.

5. An appliance of the character described comprising a member adapted to be clamped to a wheel hub, and a laterally projecting member having means to engage a spoke of the wheel.

6. An appliance of the character described comprising a member adapted to be clamped to a wheel-hub, a laterally projecting member, and a block on said member adapted to enter between two spokes of the wheel.

7. An appliance of the character described comprising a member adapted to be clamped to a wheel-hub, a laterally projecting member, and a pivoted block on said member adapted to enter between two spokes of the wheel.

8. In a device of the character described, a portion adapted to be clamped to the outer end of a wheel hub, an arm extending radially from said portion and having inwardly extending means at its outer portion to extend between and engage two adjacent spokes of the wheel.

In testimony whereof I have affixed my signature.

DANIEL J. BROWN.